April 4, 1961  G. C. DEVORE  2,977,719

BENDING MOLD

Filed July 28, 1954

INVENTOR.
GUY C. DEVORE
BY
Oscar L. Spencer
ATTORNEY

United States Patent Office 2,977,719
Patented Apr. 4, 1961

2,977,719
BENDING MOLD

Guy C. Devore, Cheswick, Pa., assignor to Pittsburgh Plate Glass Company, a corporation of Pennsylvania Filed July 28, 1954, Ser. No. 446,303

8 Claims. (Cl. 49—67)

This application relates to a bending mold. More specifically, this application relates to glass bending molds of the horizontal, female skeleton type movable into an open position wherein flat sheets of glass are initially supported on the mold and movable into a closed position defining a substantially continuous skeleton frame conforming to the outline desired for bending the glass sheet and to which the glass sheet is sagged by heating.

In horizontal, female skeleton molds designed for bending flat glass sheets into deeply bent shapes, it has previously been considered necessary to provide such molds with a plurality of mold members, at least one of which is located at each mold extremity. Each of these extreme members rotates, slides or pivots into a spread position for supporting flat glass sheets between their outboard extremities and into a closed position to form a substantially continuous upper surface providing a skeleton framework conforming in contour to the shape desired for the glass. It has also been considered necessary to impart equal opening and closing movements to each of these movable members in order to insure that the glass is not misaligned with respect to the mold.

According to a preferred embodiment of the present invention, a horizontally disposed female skeleton mold is mounted on a fixed frame and separated into two molding members, one fixed to the frame and the other movable. The movable molding member is linked to the frame by inboard and outboard linkages so arranged that its extremity farthest removed from the fixed member is not displaced vertically while it is separated horizontally from the fixed member a sufficient distance to provide a length equalling that of a flat glass sheet to be bent to the curvature of the mold. Another characteristic of these linkages is that the movable molding member tends to move into a closed mold position in juxtaposition with the fixed molding member to provide a substantially continuous frame, the upper surface of which defines the contour desired for the outline of the bent glass sheet.

In operation, the movable member is separated horizontally from the fixed member to open the mold, and a flat sheet of glass is inserted between stop members located at the outboard extremities of the mold members. The flat glass acts as a strut maintaining the mold members separated. The loaded mold is then introduced into a bending lehr, where it is exposed to heat. Upon heating, the glass softens and sags to conform to the surface of the mold. The tendency of the movable member to move toward the fixed member accelerates the conformance of the glass shape to that of the bending mold, especially during the latter stages of bending when the glass is softest.

One object of the present invention is to provide a glass bending mold of the female skeleton type having fairly simple structure.

Another object of the present invention is to provide an easily manipulated glass bending mold.

Another object of the present invention is to provide a glass bending mold comprising two molding members, one fixed and the other movable relative to the first member.

Still another object of the present invention is to provide a glass bending mold including one fixed member and one movable member, the latter capable of movement away from the former to receive flat glass and tending in such position to return toward the former molding member to provide together a substantially continuous upper, skeleton surface defining the outline desired for the bent glass.

These and other objects of the present invention will be apparent upon study of the following description of which the accompanying drawings form a part.

Figure 1:
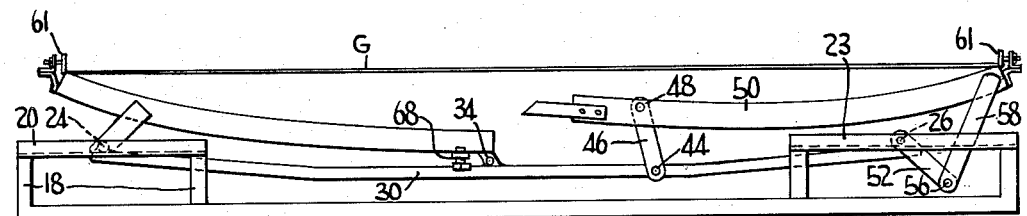
Figure 1 is a side elevational view of a glass loaded mold showing the position of a movable mold portion relative to a portion fixed to a frame when the mold is in its open position.

In the drawings, reference number 10 refers to a frame having longitudinal braces 12 and end braces 14 connecting the ends of the longitudinal braces. Intermediate cross braces 16 may be provided for additional structural support. These braces are preferably L-shape in cross-section for rigidity.

Vertical posts 18 extend upwardly from the longitudinal braces to provide a support for a superstructure frame 20 at one end of the frame. Similar vertical posts 19 are provided at the other end of the frame to support a superstructure 21.

A cross rod 24 is fixedly secured between opposing carriers 22 of superstructure 20. Another cross rod 26 interconnects carriers 23 of superstructure 21. The cross rods are substantially parallel to each other and extend transversely of the frame structure.

Interconnecting each end of the cross rods 24 and 26 are a pair of longitudinal support beams 28 and 30 shaped slightly concavely in their longitudinal direction. Longitudinal beams 28 and 30 are substantially parallel. An additional cross rod 34 interconnects the longitudinal support beams and is also connected to fixed portion 36 of mold 40. Cross rod 24 is also fixed to the fixed section 36 of the mold 40 by means of fixed connecting members 42.

An additional inboard cross rod 44 interconnects the longitudinal beams 28 and 30, extending laterally outwardly beyond the beams. The ends of cross rod 44 are connected to inboard hinges 46 and 47 which are biased upwardly and inwardly to connect to a hinge rod 48 extending transversely across a movable portion 50 of the mold 40.

Cross rod 26 is fixed to the longitudinal beams 28 and 30 and extends laterally outwardly of these beams to connect with outboard hinges 52 and 53 which extend downwardly and outwardly to connect to either end of a hinge rod 56. The latter is fixedly secured to the outer end of movable member 50 by means of downwardly and inwardly directed fingers 58 and 60. Thus, it is seen that molding member 36 is fixed to the frame 10 and molding member 50 may be pivoted longitudinally of the frame.

The movable molding member 50 is hinged to the frame 10 in such a manner that when the mold is moved to an open position to receive a flat sheet of glass, the outboard extremity of the movable molding member is maintained in substantially the same horizontal plane as its occupies in the closed mold position. This maintenance is desirable in bending glass sheets symmetrically about their transverse center line in order to separate each increment of the surface of the flat glass a uniform distance from the bending lehr heaters during the initial stages of the bending cycle. Such uniform spacing of the glass from the heaters facilitates control of the localized heating pattern to be imposed on the glass. For this reason, the maximum allowable vertical displacement of the outboard extremity of the movable molding member is about 1 inch. It is understood, however, that where glass is to be bent asymmetrically, it may be desirable to adjust the vertical displacement of the outboard extremity of the moving molding member to either raise or lower the latter as required to vary the localized heating pattern as desired.

Figure 2:
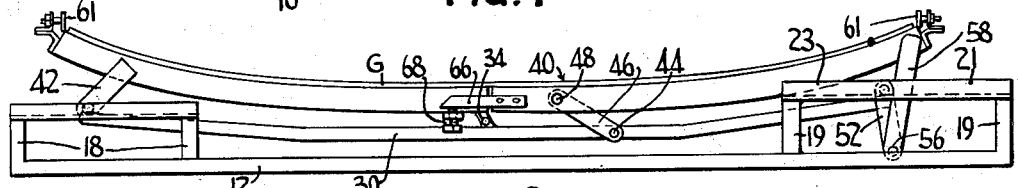
Figure 2 is a view similar to Figure 1 showing how the movable mold portion is disposed adjacent the fixed portion when the mold moves into its closed position.
Figure 3:
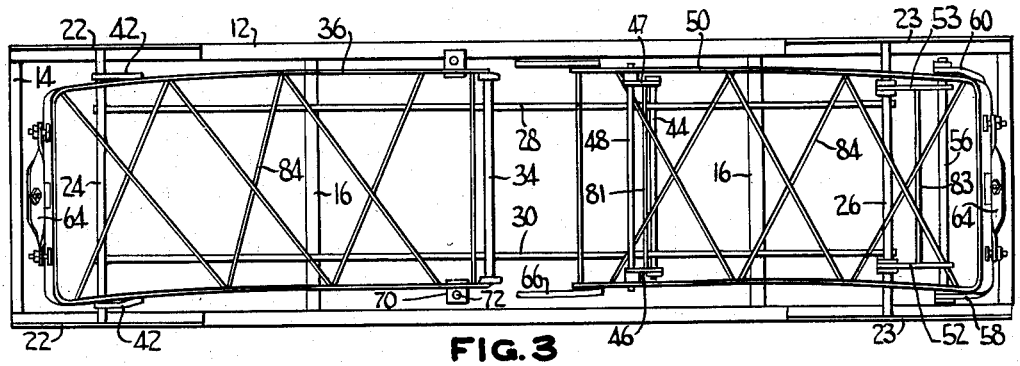
Figure 3 is a top plan view of the open mold as in Figure 1 with the glass sheet omitted for clarity.
Figure 4:
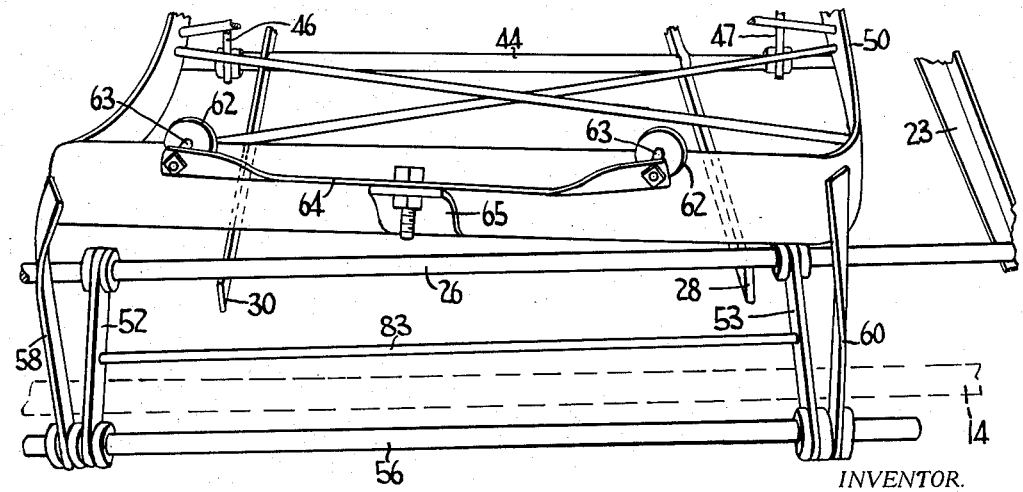
Figure 4 is an isometric view looking down at the end of the movable molding member, with certain parts omitted.

The vertical displacement of the outboard extremity of the moving molding member 50 upon displacing the latter is minimized by imparting simultaneous opposite rotations to the inboard and outboard sets of hinges connecting the movable molding member to portions of the fixed frame. For example, upon moving molding member 50 from the closed mold position of Figure 2 to the open mold position of Figure 1, inboard hinges 46 and 47 rotate clockwise as seen in the drawings, and outboard hinges 52 and 53 rotate counterclockwise. The opposite rotations imparted to the different sets of hinges cancels out any vertical component of movement at the outboard extremity of the moving molding member 50 as the latter is displaced horizontally between open and closed mold positions, while the inboard extremity of member 50 is displaced vertically. The relative length of the hinges and their orientation determines the amount of vertical movement of the outboard extremity of the movable molding member. The orientation and length of the inboard hinges 46 and 47 determines the amount of vertical displacement of the inboard extremity of molding member 50.

Another important consideration in determining the length and orientation of the hinges is that the hinges do not rotate past center when the mold is moved into open position. The rotational limitation imposed on the hinges causes the movable molding member to tend to move into juxtaposition with the fixed molding member upon displacement of the former to the open mold position, thereby promoting closing of the mold and accelerating bending of the heat softened glass sheet to the shape of the mold.

Stop members 61 are provided at the outer extremity of each of the molding members to insure proper placement of the flat glass upon the mold. The stop members may comprise adjustable buttons 62 mounted on a threaded shaft 63 at either end of a swivel bar 64. The latter is pivotally mounted about an axis defined by a nut and bolt to an ear 65 fixed to the outer wall of molding members 36 and 50. Thus, the location of the stop members may be adjusted and fixed into the adjusted position as desired.

At the inboard end of movable molding member 50 a longitudinally extending finger 66 is provided. A guide member 68 comprising an outwardly directed apertured flange 70 and an adjustable screw 72 is provided on the fixed molding member to provide a guide at either side of the mold to insure that the movable member 50 moves into proper mating position with the fixed member 36. When the mold closes, finger 66 rests atop screw 72. This insures that the inboard extremities of the upper surfaces of molding members 36 and 50 are in proper vertical alignment to produce a smooth, continuous curve.

In operation, one or more flat sheets of glass G precut to the shape desired for the final product are mounted between stop members 61 of the open mold. The loaded mold is then conveyed into a furnace where heat is applied. During the opening of the mold, the hinges 46, 47, 52 and 53 are rotated a limited amount as recited above so that the movable molding member 50 tends to return into mating position with the fixed molding member 36. As the heated glass softens, it begins to sag toward the outline defined by the upper surfaces of the molding members 36 and 50. Additional pressure is applied to the glass extremities by the stop members 61 due to the tendency of the movable molding member to return to closed position. This mechanical pressure also forces the softened glass to conform to the shape of the mold. Surprisingly, despite the unbalanced configuration of the mold when the movable molding member is moved into open position, the glass remains aligned with the mold during the bending cycle. Hence, despite the admonitions of the prior art, the present mold has been found suitable for shaping glass sheets uniformly while requiring an outboard movement at one extremity only of a glass bending mold.

It has been found desirable for purposes of convenience in manufacture that the molding members 36 and 50 be substantially equal in length. When the molding members are equal in length, the portion of the glass shaping surface provided by each molding member is the mirror image of that provided by the other molding member in the particular embodiment illustrated. Since the longitudinal curve defined by the mold shaping surface is concave in elevation, the inboard extremity of each molding member lies at the lowest elevation of the mold shaping surface in such construction. This also provides maximum clearance beneath the glass for lifting the inner extremity of the movable molding member. However, the pressure tending to close the mold due to hinging the movable molding member may be modified by altering its size as desired. For example, for extraordinarily fragile sheets, it may be necessary to have the movable molding member 50 cut into a very small portion. For thick sheets requiring large additional closing pressures, the movable member 50 may approach the size of the entire mold.

As seen in the drawings, inboard hinges 46 and 47 may be reinforced by providing an additional cross brace 81 thereacross. Similarly, a brace 83 may be provided to reinforce outboard hinges 52 and 53. In addition, the usual cross braces 84 may be included to reinforce the skeleton structure of both molding members 36 and 50.

A single embodiment has been disclosed herein for purposes of illustrating the principles of the present invention, rather than limitation.

What is claimed is:

1. Apparatus for bending glass comprising a frame, a pair of longitudinally extending framing members forming a part of said frame, a first molding member fixed to said frame, a second molding member, an inboard rod and an outboard rod extending transversely of said framing members and rigidly secured thereto, an inboard hinge connected between the inboard rod and an inboard portion of the second molding member, an outboard hinge connected between said outboard rod and an outboard portion of the second molding member, the hinges being oriented for simultaneous opposite rotations so that upon movement of the second molding member relative to the first molding member, the outboard extremity of the second molding member is maintained in substantially the same plane, whereby the second molding member is movable into an open mold position spaced from the first molding member to receive a sheet of flat glass and into a closed mold position in juxtaposition to the first molding member to form a substantially continuous curved frame having the contour defining the outline desired for the bent glass sheet.

2. Apparatus according to claim 1 wherein the movable molding member is provided with an inwardly and downwardly extending finger rigidly secured thereto and hingedly connected to one end of the outboard hinge, the outboard hinge extending upwardly and inwardly toward the fixed outboard rod, the inboard hinge extending upwardly and inwardly from its connection with the inboard fixed rod toward the movable molding member.

3. Apparatus for bending glass sheets comprising a frame, a sectionalized, skeleton mold supported on said frame, said mold comprising a shaping surface consisting of a first skeletonized molding member fixedly secured to said frame to form part of the mold shaping surface and a second skeletonized molding member movably connected to the frame for movement relative to the frame, said second member forming the remainder of the mold shaping surface and being movable toward the first member to form a substantially continuous frame defining the contour desired for the bent glass sheets, and separable from the first member; stop means adjacent the outboard longitudinal extremity of said first molding member and stop means adjacent the outboard longitudinal extremity of said second molding member to support opposite edges of a flat glass sheet therebetween when said second member is separated from said first member.

4. Apparatus as in claim 3, wherein the portion of said shaping surface provided by each molding member is the mirror image of the portion provided by the other molding member.

5. Apparatus for bending glass sheets comprising a support frame, a molding member fixed to said support frame and having an inboard extremity and an outboard extremity, a movable molding member having an inboard extremity and an outboard extremity, and means interconnecting the movable molding member with the support frame to cause the inboard extremity of the movable molding member to move between an open mold position spaced and raised from the inboard extremity of the fixed member and a closed mold position in juxtaposition with the inboard extremity of the fixed molding member to form a substantially continuous shaping surface conforming in outline and elevation to the shape desired for the bent glass sheet, and to cause the outboard extremity of the movable molding member to remain at substantially the same elevation as the outboard extremity of the fixed molding member throughout the movement of the movable molding member.

6. Apparatus as in claim 5 wherein means are provided for assuring the proper vertical alignment of the movable molding member relative to the fixed molding member when the mold is in closed position.

7. Apparatus as in claim 6 wherein the vertical alignment means comprise a laterally disposed guiding member provided adjacent the inboard extremity of one molding member and a longitudinally extending finger provided on the inboard extremity of the other molding member, which finger is mated with the guiding member when the adjacent extremities of the molding members are in proper vertical alignment to prevent additional relative vertical movement between the adjacent extremities.

8. Apparatus as in claim 5, wherein the portion of the shaping surface provided by each molding member is the mirror image of the portion provided by the other molding member.

References Cited in the file of this patent

UNITED STATES PATENTS

| | | |
|---|---|---|
| 1,338,470 | Wagenhorst | Apr. 27, 1920 |
| 1,584,849 | Coffin | May 18, 1926 |
| 1,774,648 | Henry | Sept. 2, 1930 |
| 1,999,558 | Black | Apr. 30, 1935 |
| 2,683,334 | Rugg | July 13, 1954 |
| 2,695,476 | Jendrisak | Nov. 30, 1954 |
| 2,805,520 | Black | Sept. 10, 1957 |

FOREIGN PATENTS

| | | |
|---|---|---|
| 710,393 | Great Britain | June 9, 1954 |